Aug. 4, 1959
H. PATALONG
2,898,528
SILICON SEMICONDUCTOR DEVICE
Filed May 7, 1957
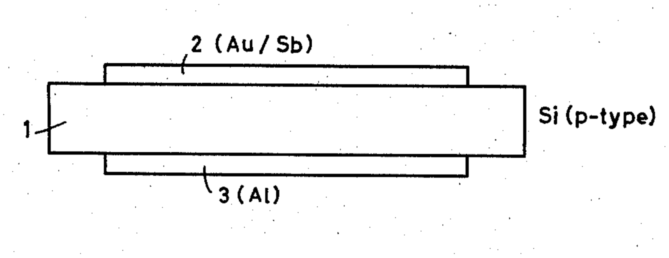

United States Patent Office 2,898,528

Patented Aug. 4, 1959

2,898,528

SILICON SEMICONDUCTOR DEVICE

Hubert Patalong, Pretzfeld, Oberfranken, Germany, assignor to Siemens-Schuckertwerke Aktiengesellschaft, Berlin-Siemensstadt, Germany, a German corporation Application May 7, 1957, Serial No. 657,631

Claims priority, application Germany May 15, 1956

3 Claims. (Cl. 317—241)

My invention relates to semiconductor devices, such as rectifiers, in which the semiconductor proper consists of silicon in substantially monocrystalline form.

The manufacture of such silicon devices requires producing an intimate fused or alloyed bond of the silicon crystal with a metallic contact material of best possible adherence and freedom from fissures. Gold with an addition of antimony has been used for such purposes. It produces a barrier contact if the silicon crystal has p-type conductance, and a barrier-free contact with n-type silicon. Heretofore, however, such gold-antimony alloys have been applied only for small contact areas up to about 1 mm.$^2$. With larger contacting areas there occur difficulties and defects due to the fact that, after forming the contacting alloy by application of heat, the subsequently cooled specimens exhibit cracks or fissures in the junction zone. It has been found that such defects can be traced back to non-uniform depth of penetration of the contact metal, or to great hardness combined with a difference between the thermal elongations of semiconductor and contact metal respectively. Non-uniform penetration was observed when contacting the silicon crystal with gold whose antimony content was less than 0.1%. Although a pressing plunger with a pressure surface parallel to the contact surface of the contact metal was used for securing uniform distribution of the liquefied contact metal, the depth of penetration was often found to be non-uniform to such a degree that no alloy formation at all occurred at singular localities of the semiconductor surface to be contacted. Formation of fissures and cracks due to excessive hardness of the alloy was observed on silicon with gold-antimony contacts containing about 25% antimony corresponding to the eutectic composition.

It is an object of my invention to obviate the above-mentioned deficiencies and to provide silicon semiconductor devices with gold-antimony contacts of any desired area size which reliably secure a uniform penetrating depth of the alloyed junction as well as absence of fissures in the finished product.

According to my invention, a semiconductor device comprising a semiconductor body of substantially monocrystalline silicon joined with one or more metallic contacts, has at least one of these contacts formed of a gold-antimony alloy in which the antimony content is between 0.2% and 5% by weight.

I have discovered and ascertained by experience that within these limits of antimony content, all above-mentioned difficulties are eliminated. The surface of the silicon crystal to be contacted becomes well wetted by the gold-antimony alloy when the alloy is melted by the heat treatment used for the joining process, and this accounts for the greatly improved uniformity of the depth down to which the alloy formation will penetrate. Such good wetting is predicated upon the mentioned minimum content of 0.2% antimony. The upper limit of 5% is given by the cold-deforming limit of the contacting gold, which is also a measure of the limit beyond which fissures occur in the finished, contacted crystal. I have found that an antimony content of about 1% is particularly favorable.

Another advantage of the invention is the fact that the alloy, containing 0.2 to 5% antimony and a remainder substantially all of gold, can be rolled down to thin foil thickness. Hence the contact metal can be deposited as a foil onto the silcon crystal and can then be joined with the crystal by heat, or heat and pressure, sufficient to melt the foil as needed for the formation of the bonding alloy of contact metal and crystal. Such use of gold-antimony foils has the advantage that, when relatively large contact areas of several mm.$^2$ up to some cm.$^2$ are to be produced, the contour and size of the contacting areas can be conveniently predetermined, as well as the desired depth of penetration or the quantity of alloy per unit area. The use of the antimony-containing gold in form of thin foils also simplifies the contact forming method because of the ease with which foil can be handled and processed.

As an example of a semiconductor device according to the invention, a silicon rectifier is illustrated on the drawing and described presently.

The rectifier comprises a monocrystalline semiconductor body 1 of p-conducting silicon in shape of a flat cylinder of approximately 0.4 mm. thickness and a diameter of approximately 10 mm. Joined with the top surface of the silicon body is an electrode 2 consisting of alloyed gold foil with a content of approximately 1% antimony. The foil has about 0.05 mm. thickness and a diameter of approximately 9 mm. Joined with the bottom surface of the silicon body 1 is an electrode 3 of aluminum having a thickness of approximately 0.05 mm. and a diameter of approximately 9 mm. Both electrodes are fusion-joined with the silicon body so that an alloyed merger zone exists between each electrode and the semiconductor body, the alloy penetrating somewhat into the silicon body. A barrier layer is formed in the alloyed zone between the gold electrode 2 and the silicon body 1 so that the device has asymmetrical conductance.

It should be understood that a gold-antimony alloy can also be used in accordance with the invention for producing a barrier-free junction. In such case, the silicon body must have n-type conductance.

The dimensions described in the foregoing are to be understood as examples only. However, it will be recognized that the junction areas between the gold-antimony electrode and the silicon crystal are of huge size as compared with the small areas for which a gold-antimony contact has heretofore been applicable.

The particular method of joining the contact metal with the silicon crystal is not essential to the invention, various such methods being known as such. According to one of these methods, the silicon disc is cut from a monocrystalline rod, and the electrode metals are cut or punched from foils and are then individually placed against the surfaces of the silicon body. Thereafter, the assembly is subjected to pressure at a temperature sufficient to melt the contact metals and to produce the alloyed junction zones. If desired, reference may be had, for further details of such a method, to the copending application of R. Emeis, Serial No. 637,029, filed January 29, 1957 for Method and Device for Producing Electric Semiconductor Devices, assigned to the assignee of the present invention.

I claim:

1. A semiconductor device, comprising a semiconductor body of substantially monocrystalline silicon, and at least one metallic contact member of foil thickness mounted on, and fusion-joined with, said body to form a junction zone of uniform depth of penetation and free from mechanical stresses, said zone being larger than 1 mm.$^2$ in area, said metallic contact member having an area equal to that of said junction zone and consisting of a gold-antimony alloy having an antimony content between 0.2 and 5% by weight.

2. A semiconductor device, comprising a semiconductor body of substantially monocrystalline silicon and a plurality of metallic electrode members of foil thickness mounted on said body to form alloyed junction zones therewith, each zone being of uniform depth of penetration and having an area of from several mm.$^2$ to several cm.$^2$, each of said metallic electrode members of foil thickness having an area equal to that of the respective junction zone, at least one of said members consisting of a gold-antimony alloy having an antimony content of about 1% by weight.

3. A semiconductor device of asymmetrical conductance, comprising a flat semiconductor body of substantially monocrystalline p-type silicon and two metallic electrodes of foil thickness joined and alloyed with said body at opposite flat sides thereof to form alloyed junction zones therewith, each zone being of uniform depth of penetration and having an area of from several mm.$^2$ to several cm.$^2$, each of said metallic electrode members of foil thickness having an area equal to that of the respective junction zone, at least one of said two electrodes consisting of a gold-antimony alloy having an antimony content between 0.2 and 5%.

References Cited in the file of this patent

UNITED STATES PATENTS

| | | |
|---|---|---|
| 2,705,768 | Kleimack et al. | Apr. 5, 1955 |
| 2,725,315 | Fuller | Nov. 29, 1955 |
| 2,784,300 | Zuk | Mar. 5, 1957 |
| 2,792,538 | Pfann | May 14, 1957 |
| 2,825,667 | Mueller | Mar. 4, 1958 |